United States Patent [19]

DeLomba

[11] 4,118,021
[45] Oct. 3, 1978

[54] SUPPORT FOR HOLDING SYRIAN BREAD

[76] Inventor: Donald A. DeLomba, 2 Canna St., Warwick, R.I. 02888

[21] Appl. No.: 824,277

[22] Filed: Aug. 15, 1977

[51] Int. Cl.² .............................................. B25B 1/20
[52] U.S. Cl. ................................. 269/86; 269/289 R
[58] Field of Search ................. 269/289 R, 269 R, 86, 269/290–295, 303

[56] References Cited
U.S. PATENT DOCUMENTS

| 1,210,349 | 12/1916 | Moore | 269/291 |
| 1,462,717 | 7/1923 | Maus | 269/293 |

Primary Examiner—Robert C. Watson
Attorney, Agent, or Firm—Barlow & Barlow

[57] ABSTRACT

A support for holding Syrian bread while being filled with food. The support receives the edges of the Syrian bread while allowing the mid portion thereof to bulge outwardly and be supported as being filled with food for the provision of a Syrian bread sandwich.

4 Claims, 6 Drawing Figures

U.S. Patent  Oct. 3, 1978  4,118,021
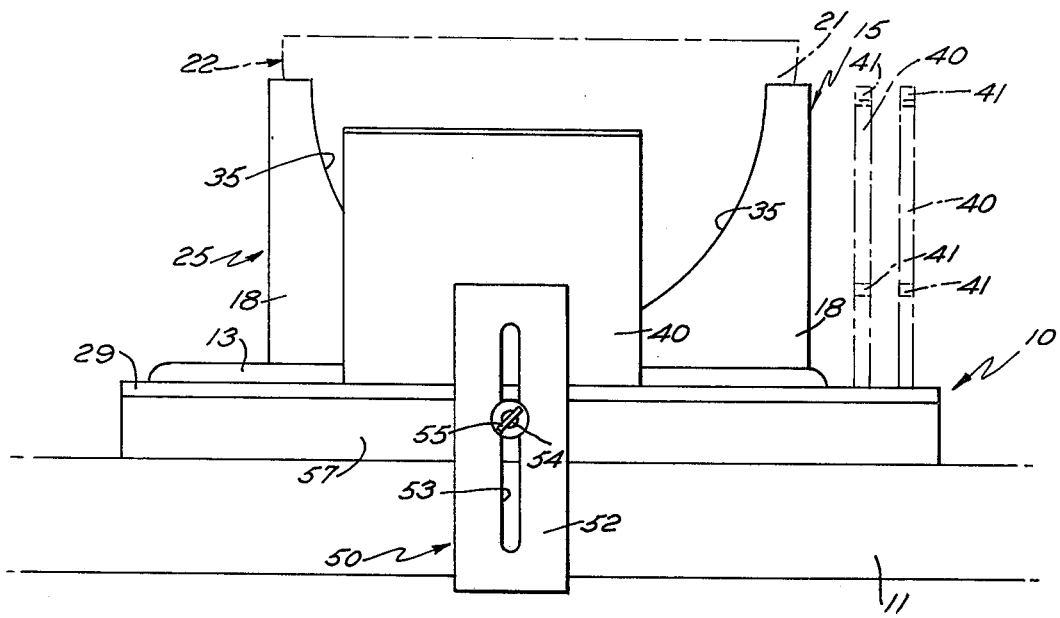
FIG. 1
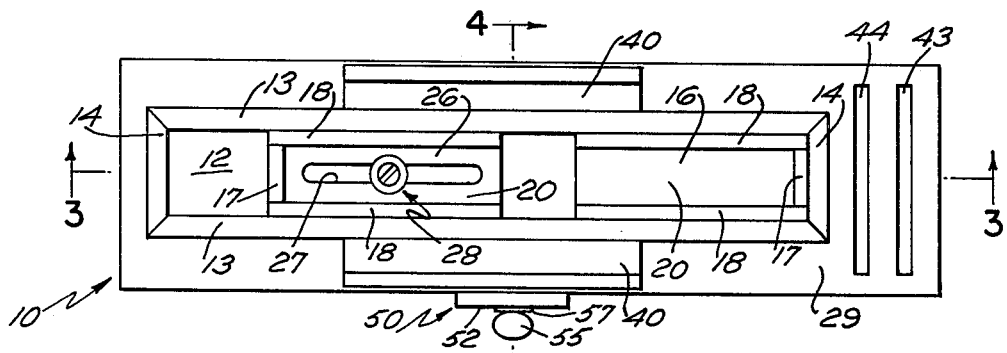
FIG. 2
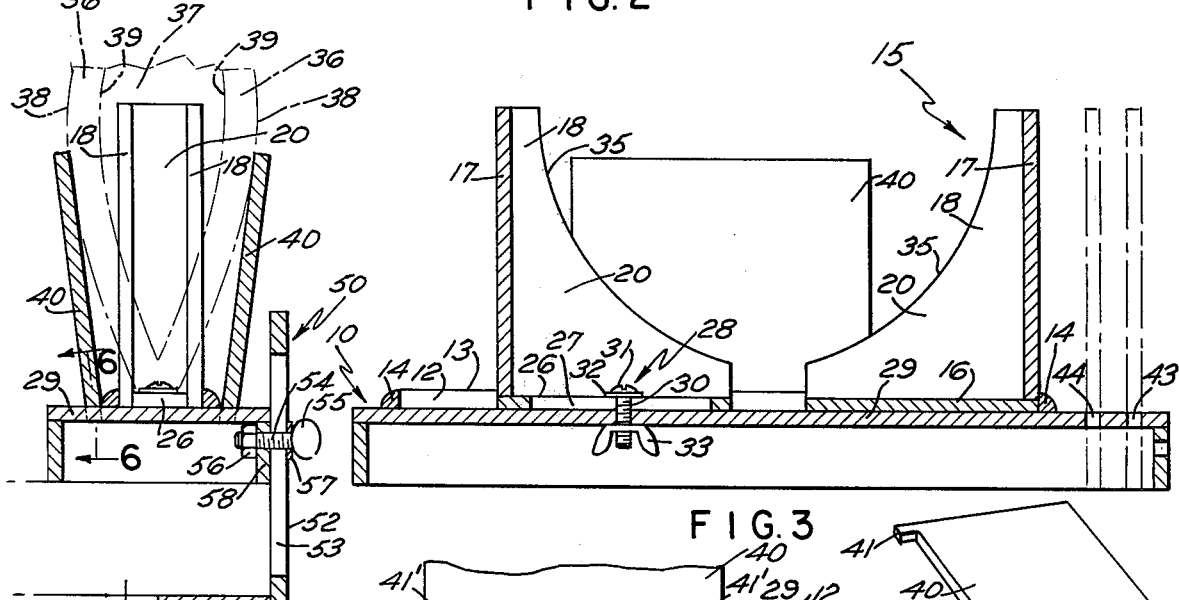
FIG. 3
FIG. 4
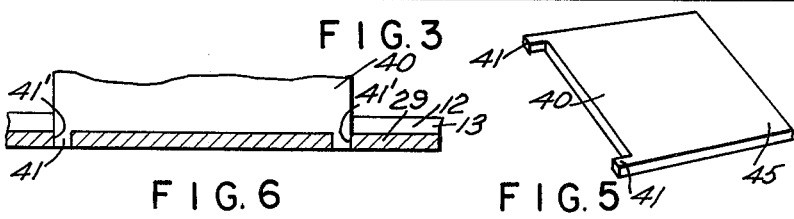
FIG. 6
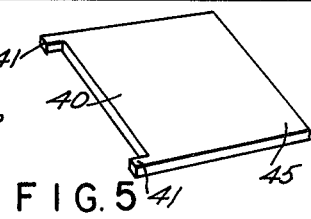
FIG. 5

SUPPORT FOR HOLDING SYRIAN BREAD

BACKGROUND OF THE INVENTION

Syrian bread as sold comprises a circular disc about eight or nine inches in diameter and about one-half inch thick with outer faces having very flexible crusts. Between these surfaces the bread is of a very coarse nature and if the disc is cut in half the cut edges may be easily spread by reason of their crustlike surfaces to spread apart the coarse inner part of the bread so that food may be placed between the two spread-apart crust faces. In performing this operation of filling the half of Syrian bread, usually one hand is used to support the half circular bread, while food is placed in between the two faces with the other hand. This becomes a very difficult situation to manually handle and very time consuming.

Supports for sandwiches and the like are usually in the form of serving trays such as in U.S. Pat. No. 2,741,901 and not intended for the placing of filling in the halves of the roll which are in this patent designed to receive a frankfurter. Holding devices for bags to be filled with french fries are known in U.S. Pat. No. 3,545,176.

SUMMARY OF THE INVENTION

This invention relates to a device having a base with members supported on the base each member having a recess to receive the edges one half a unit of the Syrian bread while the members are cut away so that the sides of the Syrian bread may flex outwardly as filling is placed in the bread. The base also receives plates to support the quite flexible sides of the half unit Syrian bread as it is being filled and means may be utilized for storing these plates on the base and also means may be provided for clamping the base to the bench while in use.

DESCRIPTION OF THE DRAWINGS

FIG. 1 is an elevation of the Syrian bread support clamped to a bench;

FIG. 2 is a top plan view of the structure shown in FIG. 1 with the bench omitted;

FIG. 3 is a section on line 3—3 of FIG. 2;

FIG. 4 is a section on line 4—4 of FIG. 1 showing in dotted lines the Syrian bread in position for filling;

FIG. 5 is a perspective view of one of the plates used for supporting the sides of the Syrian bread;

FIG. 6 is a sectional view on line 6—6 of FIG. 4.

DESCRIPTION OF THE PREFERRED EMBODIMENT

With reference to the drawings 10 designates the base of the hollow support resting upon a bench 11. A track 12 is provided on the upper surface of the base comprising spaced side rails 13 with end rails 14. A receiving member 15 comprising a bottom wall 16, end wall 17 and spaced side walls 18 is positioned within this track 12 so as to provide a recess 20 between the side walls 18 for the reception of the edge portion 21 of a semi-circular or half unit of Syrian bread 22 as shown in FIG. 1. A member 25 similar in all respects to the member 15 is also located within the track 12 and is like the member 15 except that the bottom wall 26 of this member is provided with a slot 27 through which a clamping device designated generally 28 (see FIG. 3) extends. This clamping device also extends through the top wall 29 of the base 10. This clamping device is a screw 30 which extends through the slot 27. The screw has a head 31 bearing on washer 32 and is clamped by means of a thumb screw 33 accessible beneath the hollow base 10. This member 25 also has the recess 20 between its side walls 18 which will receive the edge 21 of the Syrian bread 22 as heretofore described. The side walls 18 of these members are cut away on an arc 35 so as to leave a space as seen best in FIG. 1 for the sides 36 of the Syrian bread as seen in FIG. 4 to spread outwardly leaving a space 37 between these sides of the bread for the reception of food for the provision of a sandwich.

The outer faces of the sides 38 of this bread are the crust-like portions while the inner portions 39 are the fibrous or coarse material of the bread. As this bread spreads as shown in FIG. 4, some support is provided for the sides by means of plates 40 shown in FIG. 5 by themselves and each provided with legs 41 at two of the corners for insertion in openings 41' in the top wall 29 of the base, the legs being sufficiently small with reference to the openings into which they are inserted so that the plates will flare outwardly as seen in FIG. 4 and allow the opposite faces of the Syrian bread to flare outwardly for the reception of food contents. The plates 40 are shown in their bread supporting positions in FIGS. 1, 2 and 4 and one of these plates only is shown in FIG. 3 because of the sectional showing. When these plates 40 are not in use, they may be stored in slots 43 and 44 formed in the base by sticking one of the corners such as 45 (see FIG. 5) into the slot leaving the legs 41 extending upwardly as seen in dotted lines in FIG. 1.

In use, it may be desirable to clamp the base upon a bench and for this purpose I have provided a bracket 50 having a bottom leg 51 and an upstanding arm 52 which is slotted as at 53 and a screw 54 having a handle 55 and a nut 56 and washer 57 may be utilized to pass through an opening in the side wall 58 of the base to clamp the base on the bench 11 as perhaps best shown in FIG. 4.

I claim:

1. A support for holding Syrian bread while being filled with food comprising a base, a pair of similar L-shaped members having foot and upstanding arm portions, said foot portions mounted on said base, said upstanding arms provided with recesses facing each other to receive the edge of the bread and said members being spaced to permit the opposite faces of the bread to bulge outwardly between said recesses for filling with food between said faces, plates at flaring angles to said base mounted on said base at either side of said members along the space between said recessed members to act as supports for the opposite faces of said bread as it spreads outwardly thru said spaces.

2. A support as in claim 1 wherein one of said members is mounted for movement toward and from the other member.

3. A support as in claim 1 wherein one of said members is mounted for movement toward and from the other member and has a bottom wall slidable on said base, an end wall and a pair of spaced side walls.

4. A support as in claim 1 wherein one of said members is mounted for movement toward and from the other member and has a bottom wall slidable on said base, said bottom wall having a slot with clamping means extending therethrough.

* * * * *